Dec. 2, 1930.  A. P. DAVIDSON  1,783,224
LIFTING DEVICE FOR MOTOR VEHICLES
Filed Aug. 9, 1929
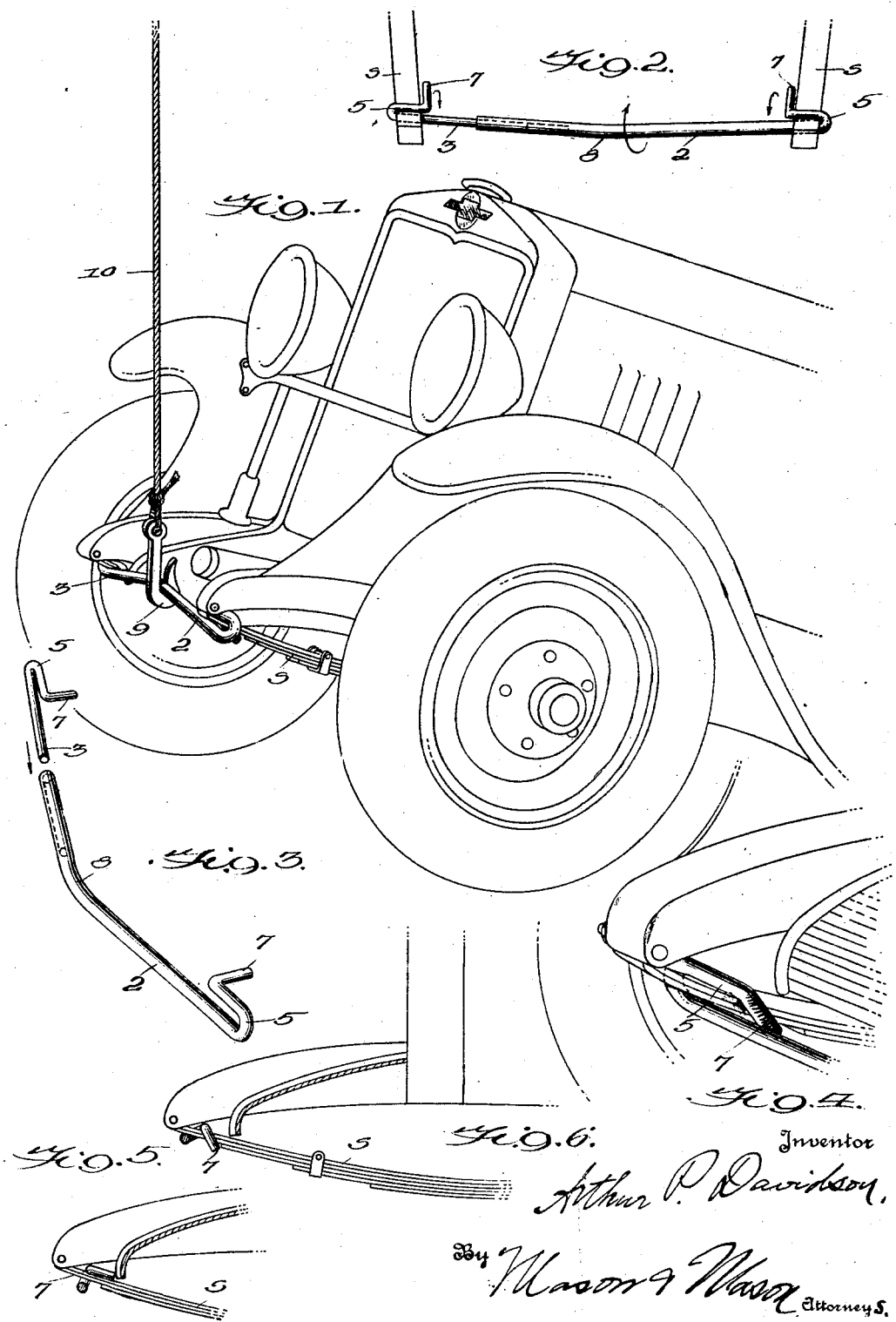

Patented Dec. 2, 1930

1,783,224

UNITED STATES PATENT OFFICE

ARTHUR P. DAVIDSON, OF ODESSA, TEXAS

LIFTING DEVICE FOR MOTOR VEHICLES

Application filed August 9, 1929. Serial No. 384,609.

This invention relates to lifting devices for motor vehicles and more particularly to a device for use in car unloading and in the shop for raising the forward part of the automobile.

In its preferred form the device includes a bar, either solid or longitudinally adjustable, provided at its opposite ends with recurved or hook shaped portions which are constructed and arranged to slip over the forward ends of the car springs, the device being provided with portions which automatically drop behind the springs so as to prevent displacement.

The particular features of novelty of the invention will be better understood from the following detailed description when considered in connection with the accompanying drawings in which:

Fig. 1 is a perspective view illustrating the forward portion of a motor vehicle with the lifting device applied to the springs thereof; Fig. 2 is a view in front elevation illustrating the application of a slightly modified form; Fig. 3 is a perspective view of the device shown in Fig. 2 with the parts slightly separated; Fig. 4 is an enlarged detail view; Fig. 5 is a sectional detail illustrating the end portion of the device in one position and Fig. 6 is a similar view of the device in a different position.

Referring to Fig. 2, as therein shown the lifting tool is composed of a bar made up of two members, 2, 3, the latter being telescopically received within one end of the former to provide for adjustment for springs 8 which are spaced at different distances transversely of the car. The two-part bar is provided at its opposite ends with recurved or hooked portions 5, within which are received the forward end portions of the car springs, said hooked portions terminating in right angular projections 7. When the hooked ends 5 of the bar are slipped over the springs the parts will be in the position as shown in Fig. 2.

The bar 2—3 is preferably provided at its center with a slight deflection or bend 8 which portion is conveniently engaged by a lifting hook, as 9, shown in Fig. 1. This hook has connected thereto a line or chain 10 to which power is applied suitably for raising the forward end of the motor vehicle in the manner as shown in Fig. 1 when the lifting device is applied thereto.

By referring to Fig. 4 it will be seen that the right angular bent portion 7 of the hook will, when the bar is rotated after the hooks 5 have been engaged with the springs 8, be positioned inwardly of the springs so as to engage their inner surfaces, thus preventing longitudinal movement of the lifting bar with resultant displacement of the same. The movement of the hooks 5 and bent ends 7 of the lifting bar to cause the ends 7 to be positioned in locking engagement with the inner sides of the springs 8 is well illustrated in Figs. 5 and 6.

In the form of the invention illustrated in Fig. 1, the bar is made of one solid piece instead of two telescopic members as shown in Figs. 2 and 3. It will be observed that this lifting bar with its bent or hook shaped ends is adapted for application to the extreme forward end portions of the front springs without interfering with the splash apron, which latter stands out to a point almost in line with the front shackle bolts. By engaging the springs at this point the tool allows the hoisting hook and tackle, to be used as low as the springs, and to extend outwardly slightly in the center of the bar in order to hold the hoist members clear of the splash aprons. Engagement of the bar by the lifting hook 9 will rotate the bar causing the ends 7 to pass inside of the inner surfaces of the springs thereby preventing accidental displacement of the lifting bar while the car is being lifted.

The advantages of this invention lie in its simplicity, combined with ready adaptability for application to the forward end portions of the springs, and reliable engagement therewith automatically when the lifting strain is applied to the bar, and at the same time permitting engagement at such low point as to permit application of the lifting hook to the bar at the lowest possible point relatively to the frame of the motor vehicle.

Changes may be made in the relative arrangement of the various parts of the lifting bar without departing from the spirit of the invention, provided such changes are within the scope of the following claim.

I claim:

In a lifting device for motor vehicles, the combination of a bar arranged to engage the opposite end portions of the forward springs of the vehicle and provided with hooks to pass under, around and over said ends, and angular locking extensions on said hooks adapted to be moved in position adjacent the inner faces of said springs upon rotation of said bar.

In testimony whereof I have hereunto set my hand this 6th day of August, A. D. 1929.

ARTHUR P. DAVIDSON.